United States Patent [19]
Saito

[11] Patent Number: 5,524,206
[45] Date of Patent: Jun. 4, 1996

[54] SUB-CPU MONITORING SYSTEM INCLUDING DUAL PORT MEMORY

[75] Inventor: Shigeaki Saito, Tokyo, Japan

[73] Assignee: NEC Corporation, Tokyo, Japan

[21] Appl. No.: 384,458

[22] Filed: Feb. 2, 1995

Related U.S. Application Data

[63] Continuation of Ser. No. 868,770, Apr. 16, 1992, abandoned.

[30] Foreign Application Priority Data

Apr. 16, 1991 [JP] Japan ................................. 3-082755

[51] Int. Cl.$^6$ .............................................. C06F 13/00
[52] U.S. Cl. ............................................... 395/182.21
[58] Field of Search ............................ 371/16.2, 16.3; 395/575, 182.21

[56] References Cited

U.S. PATENT DOCUMENTS

| | | | |
|---|---|---|---|
| 4,358,823 | 11/1982 | McDonald et al. | 364/200 |
| 4,453,210 | 6/1984 | Suzaki et al. | 364/200 |
| 4,752,930 | 6/1988 | Kitamura et al. | 371/62 |
| 4,811,200 | 3/1989 | Wagner et al. | 364/200 |
| 4,819,154 | 4/1989 | Stiffler et al. | 364/200 |
| 4,933,838 | 6/1990 | Elrod et al. | 364/200 |
| 5,003,466 | 3/1991 | Schan, Jr. et al. | 364/200 |

FOREIGN PATENT DOCUMENTS

| | | |
|---|---|---|
| 3137313 | 3/1983 | Germany . |
| 3726489 | 2/1989 | Germany . |

*Primary Examiner*—Robert W. Beausoliel, Jr.
*Assistant Examiner*—Norman M. Wright
*Attorney, Agent, or Firm*—Foley & Lardner

[57] ABSTRACT

A multiprocessor system including dual port memories (DPMs), each DPM used as a shared memory circuit for a host CPU circuit and one of sub CPU circuits. Each sub CPU writes an operation information thereof in a monitor information memory portion of an associated DPM after data write to a data portion of the DPM every data collection. The host CPU references the operation information in the monitor information memory portion and reads data from the DPM after a normal operation of the sub CPU is confirmed. When the sub CPU operates abnormally, the host CPU resets the sub CPU operating normally. A watch-dog timer monitors only operation of the host CPU.

3 Claims, 4 Drawing Sheets

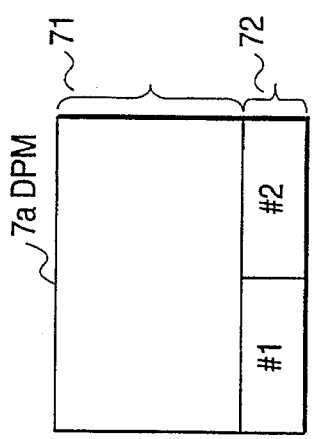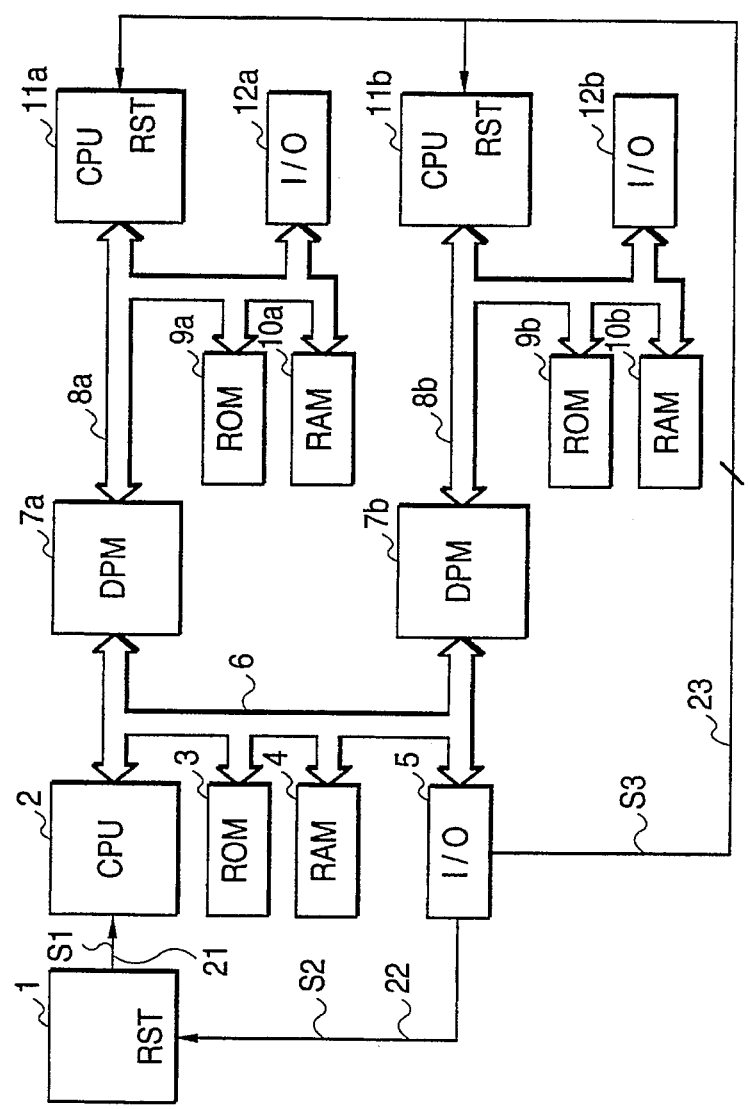

FIG. 5(a)

| LINE | STEPS OF THE CPU2 | CURRENT OPERATION INFORMATION #1 OF CPU2 | INFORMATION IN THE DPM 7a #2 | INFORMATION IN THE DPM 7a #1 | OPERATION INFORMATION #1 IN THE RAM 10a | STEPS OF THE CPU 11a |
|---|---|---|---|---|---|---|
| 1 | 312 | A | 1 | A | A | (411) |
| 2 |  |  | CLEAR | B | B | (419) |
| 3 | (315) | B | 1 |  |  |  |
| 4 |  |  | CLEAR | A | A | (419) |
| 5 | (315) | A | 1 |  |  |  |
| 6 |  |  | CLEAR | B | B | (419) |
| 7 | (315) | B | 1 |  |  |  |

FIG. 5(b)

ABNORMAL OPERATION 1

| 11 | 313 NG | X | 1 | X |  |  |
|---|---|---|---|---|---|---|
| 12 | 318 Y | X | 1 | X |  |  |
| 13 | 319 | → DETECT ABNORMAL OPERATION |  |  |  |  |

FIG. 5(c)

ABNORMAL OPERATION 2

| 21 | 313 NG | B | 1 | B |  |  |
|---|---|---|---|---|---|---|
| 22 | 318 Y | B | 1 | B |  |  |
| 23 | 319 | → DETECT ABNORMAL OPERATION |  |  |  |  |

FIG. 5(d)

ABNORMAL OPERATION 3

| 31 | 313 NG | B | CLEAR | B | B | 415 NG |
|---|---|---|---|---|---|---|
| 32 |  |  | 1 | B |  | (420) |
| 33 |  | A | CLEAR | A | A | (419) |
| 34 | 315 | → NORMAL OPERATION |  |  |  |  | ns shared memory" hereinafter) shared by a
SUB-CPU MONITORING SYSTEM INCLUDING DUAL PORT MEMORY This application is a continuation, of application Ser. No. 07/868,770, filed Apr. 16, 1992, now abandoned.

BACKGROUND OF THE INVENTION

1. Field of the Invention

The present invention relates to a multiprocessor system utilizing dual-port random access memories (referred to as "DPMs", hereinafter) each used as a memory circuit (referred to as "shared memory" hereinafter) shared by a host central processing unit (host-CPU) circuit and one of the sub-central processing unit (sub-CPU) circuits and, particularly, to a method of detecting abnormal operation of any of the sub-CPU circuits and resetting the sub-CPU circuit operating abnormally.

2. Description of the Prior Art

A conventional multiprocessor system of this kind includes a host-CPU circuit, a plurality of sub-CPU circuits and shared memories corresponding in number to the sub-CPU circuits. Each of the host-CPU circuit and the sub-CPU circuits includes a CPU for processing data, etc., a read-only memory (ROM) circuit for storing programs, etc., of the CPU circuit, a random access memory (RAM) circuit used for arithmetic operations, an input-output (I/O) circuit which is an interface circuit between the CPU and external devices, and a watch-dog timer circuit (U.S. Pat. No. 4,752,930) for monitoring operations of the CPU. The host-CPU circuit and each sub-CPU circuit share a DPM as a shared memory for data, etc. In such multiprocessor systems, the sub CPU circuits collect data, such as alarm information of devices and performance information in the DMPs associated therewith, and the host-CPU circuit processes the data stored in the DPMs.

The host- and sub-CPU circuits are continuously monitored by the internally provided watch-dog timers, respectively, and, when any CPU circuit operates abnormally, for example, it runs abnormally, the CPU circuit is reset by the associated watch-dog timer. Since, however, the DPM connected thereto may have been written with abnormal data before such resetting of the CPU, or normal data is lost by the resetting operation, the reliability of data in the DPM is lost as a whole. Further, it is inevitable that any CPU which operates abnormally may read in data written from a CPU operating normally as different data and/or read in data from an erroneous address. That is, when any of CPUs of the multiprocessor system becomes abnormal, data commonly stored in the DPM associated therewith becomes meaningless.

Further, the host-CPU circuit or the sub-CPU circuit cannot know when the sub-CPU circuit or the host-CPU circuit becomes abnormal and therefore there is a problem of data inconsistently occurred in exchange of data between them. For example, the host-CPU cannot detect the loss of data in the DPM due to resetting of an associated sub-CPU. Therefore, the host-CPU circuit may process data a portion of which is lost as if it is correct data. When such erroneous data thus processed as correct data is used by another sub-CPU circuit through the host-CPU circuit, the influence of data loss may be spread over the whole processor system.

Further, in the multiprocessor system, since each CPU requires a watch-dog timer, it becomes expensive.

SUMMARY OF THE INVENTION

Object of the Invention

Therefore, a first object of the present invention is to provide a multiprocessor system which is not influenced by erroneous data, a portion of which is lost due to abnormal operation of any of CPU circuits constituting the multiprocessor system.

A second object of the present invention is to provide a multiprocessor system in which a host-CPU circuit monitors sub-CPU circuits and can reset any of the sub CPU circuits which operate abnormally.

A third object of the present invention is to provide a multiprocessor system which includes a single watch-dog timer circuit.

Summary of the Invention

A multiprocessor system according to the present invention comprises, similarly to the conventional multiprocessor systems, a host-CPU circuit including a host CPU, a ROM, a RAM and an I/O connected by bus lines mutually, a plurality of sub-CPU circuits each including a sub-CPU, a ROM, a RAM and an I/O connected by bus lines mutually and a plurality of DPMs corresponding in number to the sub-CPU circuits, each of the DPMs being connected to the host-CPU and one of the sub-CPUs by respective bus lines such that it is accessed thereby. The host-CPU has an internal watch-dog timer.

Each sub-CPU circuit periodically provides predetermined monitor information related to the sub-CPU by means of monitor means constituted with the sub-CPU circuit itself and a software, and writes it in a monitor information memory portion of the DPM shared by the host-CPU connected thereto. It should be noted that the monitor information of the sub-CPU is sometimes referred to as "operation information". On the other hand, monitor and detection means, constituted by the host-CPU circuit and software, monitors an operation of the sub-CPU by reading the operation information of the sub-CPU from the DPM thereof. When an abnormal operation of the sub-CPU is detected from the operation information, the monitor and detection means sends a reset signal to a reset terminal of the abnormal sub-CPU through control means to reset the abnormally operating sub-CPU and, at the same time, inhibit data write from a data memory portion of the DPM.

When status information of data collected in the data memory portion of the DPM is also stored in a portion of the monitor information memory portion of the DPM as one of monitor information and the monitor means of the sub-CPU circuit has means for detecting the operation information and the status information in the DPM, the sub-CPU itself can detect an abnormality of the collected data in the DPM and inhibit collected data write in the DPM connected thereto.

BRIEF DESCRIPTION OF THE DRAWINGS

The above-mentioned and other objects, features and advantages of the present invention will become more apparent from the following detailed description when taken in conjunction with the accompanying drawings, wherein:

FIG. 1 is a block diagram of an embodiment of a multiprocessor system according to the present invention;

FIG. 2 is a diagrammatic illustration of a memory region of a DPM 7a shown in the embodiment in FIG. 1;

FIG. 5 shows memory statuses of monitor information #1 and #2 in respective operation steps in FIGS. 3 and 4, in which (a) shows a normal operation and (b) to (d) show abnormal operations, respectively.

DETAILED DESCRIPTION OF THE PREFERRED EMBODIMENT

Figure 3:
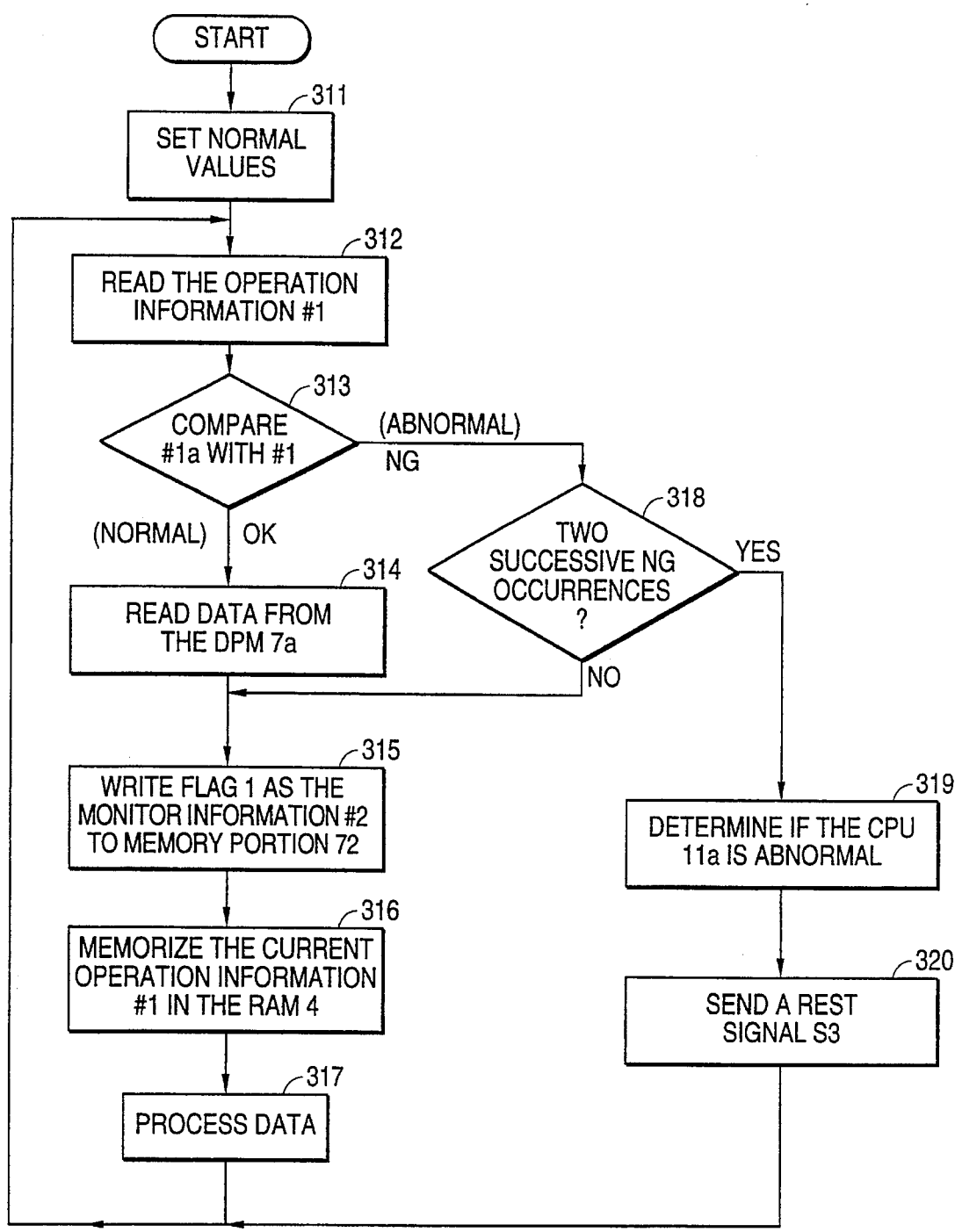
FIG. 3 is a flowchart of an operation of a CPU 2 used in the embodiment in FIG. 1.

Referring to FIGS. 1 and 2, a multiprocessor system according to the present invention comprises a host-CPU circuit including a CPU 2 and two sub-CPU circuits including CPUs 11a and 11b, respectively. These sub-CPU circuits collect, through the I/Os 12a and 12b, alarm information and performance information of external devices (not shown) connected thereto in DPMs 7a and 7b, which are memories share with the host-CPU 2. The host-CPU circuit processes the data collected in the DPMs 7a and 7b.

The host-CPU circuit includes the CPU 2, a ROM 3 storing programs, etc., of the host-CPU circuit, a RAM 4 which is a memory for arithmetic operations, etc., an I/O 5 which is an interface with respect to external devices (not shown) and a bus line 6 for connecting these components mutually and connecting a first input/output terminal of the DPM 7a to a first input/output terminal of the DPM 7b. Further, one of the sub-CPU circuits, that is, a first sub CPU circuit, include a sub-CPU 11a, a bus line 8a which connects the CPU 11a, the I/O 12a, the ROM 9a for storing the programs, etc., of the sub-CPU circuits, the RAM 10a which is a memory for arithmetic operations, the above-mentioned components and a second input/output terminal of the DPM 7a, mutually. The second sub-CPU circuit includes a sub-CPU 11b, a bus line 8b which connects the CPU 11b, the I/O 12b, the ROM 9b for storing the programs, etc., of the sub-CPU circuit, the RAM 10b which is a memory for arithmetic operations, the above-mentioned components and a second input/output terminal of the DPM 7b, mutually.

An operation of this multiprocessor system will be described with reference to FIGS. 1 and 2, paying special attention to a monitor and reset operation for an abnormal operation of one of the sub-CPU circuits. Since operation of the host-CPU circuit with respect to the first sub-CPU circuit is the same as that with respect to the second sub CPU circuit, only exchange of data and monitor of information #1 and #2 between the host CPU circuit and the first sub-CPU circuit will be described.

The DPM 7a has a data portion 71 for storing data taken through the I/O 12b in the CPU 11a and a monitor information memory portion 72 for storing the operation information #1 produced by the CPU 11a and the monitor information #2 which is a status information enabling data read/write of the DPM 7a. The operation information #1 is composed of mutually different data A and B alternating every predetermined data collection period during the periods when CPU 11a operates normally. The monitor information #2 comprises a flag 1 for enabling the CPU 11a to write data to the data portion 71 and a flag clear for enabling the CPU 2 to read data from the data portion 71 and, during a normal operation of the CPUs 2 and 11a, the CPU 2 and the CPU 11a write the flag 1 and the flag clear in the monitor information memory portion 72, alternatively.

During a normal processing in normal operation of the CPU 11a, the CPU 11a stores the operation information #1 in a monitor information memory portion 72 after data write to the data portion 71. On the other hand, the CPU 2 accesses the monitor information memory portion 72 to read the operation information #1 before the data is read from the data portion 71 and compares a current operation information #1 with a preceding operation information #1a having been stored in the RAM 4. When the result of the comparison indicates a normal operation of the CPU 11a, the CPU 2 reads the data from the data portion 71 and processes data of the sub-CPU circuit including that data. On the other hand, when an abnormality of the operation of the CPU 11a is detected, the CPU 2 does neither read data from the data portion 72 nor perform data processing mentioned above. Instead thereof, the CPU 2 sends a reset signal S3 through the I/O 5 and a control line 23 to a reset terminal RST of the CPU 11a to reset the latter.

In this case, this operation of the CPU 2 is continuously monitored by a watch-dog timer 1 which is reset by a signal S2 having a constant period and supplied from the I/O 5 through a signal line 22. When there is an abnormal operation occurred in the CPU 2, the watch-dog timer 1 resets the CPU 2 by a reset signal S1 on a control line 21. When the CPU 2 is reset in this manner, the CPU 11a is also reset in any of the following manners. In a first manner, the CPU 2 automatically sends a reset signal S3 on a signal line 23 to reset the CPU 11a. In the second manner, the CPU 2 checks the operation information #1 in the monitor information memory portion 72 of the DPM 7a and, when there is an abnormality in the CPU 11a, sends the reset signal S3 to reset the CPU 11a. In the third manner, the CPU 2 checks the operation information #1 read out from the monitor information memory portion 72 of the DPM 7a and data (data length, data number and data content) read out from the data portion 71 and, when there is any inconsistency therebetween, resets the CPU 11a.

An operation flow of the CPU 2 in the embodiment shown in FIG 1 will be described with reference to FIG. 3, paying a special attention to a monitor and reset operation for an abnormal operation of the CPU 11a.

When this multiprocessor system is started, the CPU 2 sets the RAM 4 and the DPM 7a to normal values, respectively (step 311). Then, the CPU 2 periodically reads the operation information #1 of the CPU 11a which is stored in the monitor information memory portion 72 of the DPM 7a (Step 312). Further, the CPU 2 compares the preceding operation information #1a stored in the RAM 4 with the above-mentioned operation information #1 (Step 313). When the result of the comparison indicates a normal operation of the CPU 11a (OK in Step 313), the CPU 2 reads data from the data portion 71 of the DPM 7a (Step 314). Upon completion of the normal data read in the Step 314, the CPU 2 writes flag 1 as the monitor information #2 in the monitor information memory portion 72 (Step 315) and enables data write from the CPU 11a to the DPM 7a. Simultaneously, the CPU 2 memorizes the current operation information #1 in the RAM 4 (Step 316). In this case, it should be noted that the operation information #1 stored in the Step 316 becomes the preceding operation information #1a. Thereafter, the CPU 2 performs the same operation for the DPM 7b and processes data read in from the DPMS 7a and 7b (Step 317).

When the comparison performed in the Step 313 indicates an abnormal operation (NG), the CPU 2 performs the reference at least twice (Step 318). When there is not at least two successive NG occurrences (NO in Step 318), the CPU 2 determines that the CPU 11a is normal and is shifted to the normal operation in the Step 315 with only one stop of data read from the data portion 71. On the other hand, when there are at least two successive NG occurrences (YES in Step 318), the CPU 2 determines that the CPU 11a is abnormal (Step 319) and then sends a reset signal S3 through the I/O 5 and the control line 23 to reset the CPU 11a (Step 320). Then, the CPU 2 returns to the Step 312 and performs the data read operation again.

Figure 4:
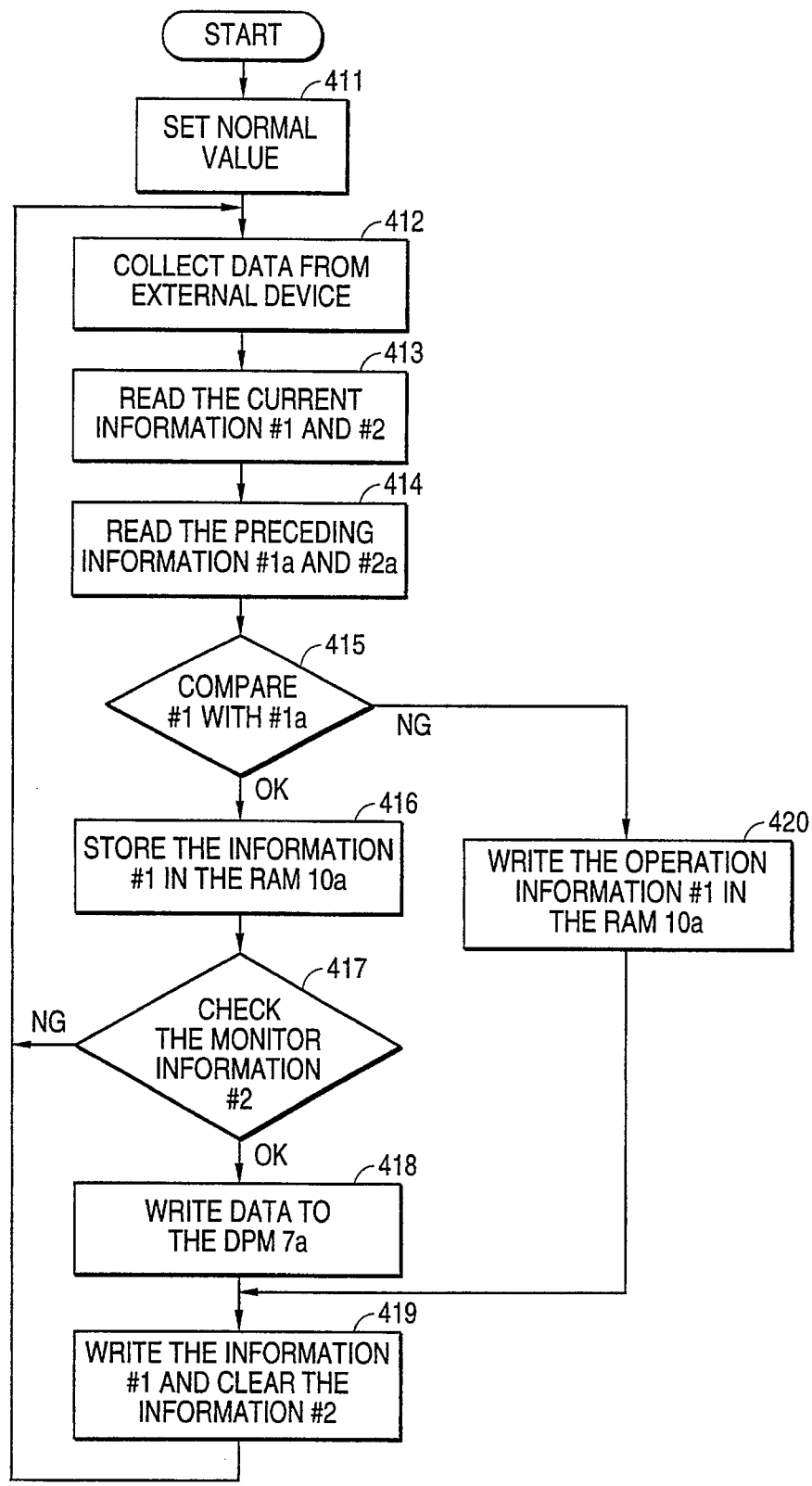
FIG. 4 is a flowchart of an operation of a CPU 11a used in the embodiment in FIG. 1.

An operation flow of the CPU 11a in the embodiment in FIG. 1 will be described in detail with reference to FIG. 4, paying special attention to the abnormality monitoring operation thereof.

When the multiprocessor system is started, the CPU 11a sets the RAM 10a and the DPM 7a to normal values respectively (Step 411). Then, the CPU 11a periodically collects data from external devices through the I/O 12a (Step 412). Thereafter, the CPU 11a reads the current operation information #1 and the current monitor information #2 from the monitor information memory portion 72 of the DPM 7a (Step 413) and the preceding operation information #1a and the preceding monitor information #2a from the RAM 10a (Step 414). The CPU 11a compares the current operation information #1 with the preceding operation information #1a (Step 415). When it is confirmed by this comparison that the CPU 11a is normal (OK in Step 415), the CPU 11a sets and stores the current operation information #1 in the RAM 10a (Step 416). It should be noted that the operation information #1 stored in this stage becomes the preceding operation information #1a. The CPU 11a checks the monitor information #2 which had been read (Step 417). When the check indicates OK (the monitor information #2 is flag 1) and a normal operation of the CPU 2 and a normality of data in the data portion 71 are confirmed, the CPU 11a writes the collected data in the data portion 71 of the DPM 7a (Step 418). Further, the CPU 11a writes the current operation information #1 in the monitor information memory portion 71, clears the monitor information #2 (Step 419) and then returns to the Step 412.

When the reference in the Step 415 indicates NG, the CPU 11a writes the operation information #1 set in the monitor information memory portion 72 in the RAM 10a (Step 420) and shifts to the Step 419. As a result, the data collected once by the CPU 11a is discarded.

When data abnormality in the data portion 71 is detected by the reference result of NG in the Step 417, the CPU 11a does not perform a data write to the data portion 71 and shifts to the Step 412 to perform the operation starting from the data collection again.

Referring now to FIG. 5(a), in a normal processing of the multiprocessor system during normal operation, the CPU 11a writes the operation information #1, which includes alternative data A and B, in the data collecting periods thereof in the monitor information memory portion and clears the monitor information #2 of the CPU 2 (Step 419), after writing the data to the data portion 71 of the DPM 7a completes (Step 418). Then, the CPU 2 reads the operation information #1 from the monitor information memory portion 71 and, when data of this information #1 is different from data of the preceding operation information #1a stored in the RAM 4, that is, when #1 is A and #1a is B or when #1 is B and #1a is A, determines the CPU 11a as normal and reads data on the data portion 71. Upon completion of this data read, the CPU 2 makes the monitor information #2 of the monitor information memory portion 72 as flag 1 (Step 315), enabling data write from the CPU 11a to the data portion 71. When there is an abnormal operation of the CPU 11a occurred in a line 7 (FIG. 5(a)), the operation step is shifted to abnormal operations 1 to 3 in FIGS. 5(b) to 5(d).

In FIG. 5(b), when the operation information #1 of data X is written in the monitor information memory portion 72 due to abnormal operation of the CPU 11a, the result of comparison performed in the Step 313 by the CPU 2 with respect to the preceding operation information #1a prior to the data read (Step 314) from the DPM 7a becomes NG. The CPU 2 repeats the comparison of the current operation information #1 with the preceding operation information #1a continuously (Step 318) and, when at least two NGs result from the continuous comparison operation (YES in Step 318), it is determined as an abnormality of operation of the CPU 11a. Therefore, the CPU 2 does not perform data read from the data portion 71.

Referring to FIG. 5(c), when no data of the operation information #1 is written in the monitor information memory portion 72 in an abnormal operation of the CPU 11a, the previous data B is kept in the monitor information memory portion 72. In this case, the Step 313 results in NG since the operation information #1a in the RAM 4 connected to the CPU 2 is also data B and, therefore, the Step 318 also results in YES. This state is similar to that shown in FIG. 5(b) and thus an abnormal operation of the CPU 11a is detected.

Referring to FIG. 5(d), the same operation information #1 of data B as the previous information is written in the monitor information memory portion 72 again upon the abnormal operation of the CPU 11a. In this case, however, the CPU 11a writes the operation information #1 of the monitor information memory portion 72 in the RAM 10a (Step 420) and, therefore, the processing of the CPU 2 and the CPU 11a are recovered to normal (Steps 419, 315) with only the data collected once by the CPU 11a in the line 32 being discarded.

Since, as mentioned above, the CPU 2 and the CPU 11a execute the data write and read operations with respect to the DPM 7a after they confirm whether or not the operation and monitor information #1 and 190 2 in the monitor information memory portion 72 are correct, any data input to or output from the data portion 71 is not performed unless the CPU 2 and the CPU 11a operate normally and therefore there is no inconsistency of data between the CPU 2 and the CPU 11a. It is clear that the above-mentioned relation is also established between the CPU 2 and any of the sub-CPU circuits of the multiprocessor system since the CPU 2 knows operating conditions of these sub-CPU circuits.

Further, as mentioned above, in this multiprocessor system, only the host-CPU 2 requires the watch-dog timer 1 for resetting an operational abnormality thereof and the sub-CPUs such as CPUs 11a and 11b, etc., do not require watch-dog timers since they are reset by the CPU 2 when their operation become abnormal. Therefore, it is possible to restrict the number of watch-dog timers required in this system to one.

Although the present invention has been described with reference to the specific embodiments, this description is not meant to be construed in a limiting sense. Various modifications of the disclosed embodiments as well as other embodiments of the present invention, will become apparent to persons skilled in the art upon reference to the description of the present invention. It is therefore contemplated that the appended claims will cover any modifications or embodiments as fall within the true scope of the present invention.

What is claimed is:

1. A multiprocessor system comprising:
   a host central processing unit circuit, including:
      a host central processing unit,
      a first read only memory,
      a first random access memory,
      a first input/output circuit, and a first bus line, mutually connecting said host central processing unit, said first read only memory, said first random access memory and said first input/output circuit;

at least one sub-central processing unit circuit, including;
   a sub-central processing unit,
   a second read only memory,
   a second random access memory,
   a second input/output circuit, and
   a second bus line, mutually connecting said sub-central processing unit, said second read only memory, said second random access memory and said second input/output circuit; and
   a shared memory circuit provided for every said sub-central processing unit circuit, each said shared memory circuit including;
   a dual port random access memory having a first input/output terminal accessed from said host central processing unit through said first bus line and a second input/output terminal accessed from said sub-central processing unit through said second bus line, said dual port random access memory including
   1) a data memory for storing data from said host central processing unit circuit and said sub-central processing unit circuit; and
   2) monitor information memory means for storing operation information indicative of an operating state of said sub-central processing unit circuit; and
   said sub-central processing unit circuit further including monitor means for producing said operation information and storing said operation information in said monitor information memory means;
said host central processing unit circuit further including:
   operation information detecting means for detecting operation information of said sub-central processing unit by accessing said monitor information memory means;
   said host central processing unit circuit responsive to said detected operation information for detecting if said sub-central processing unit is operating abnormally; and
   reset means connected to said host central processing unit for resetting said sub-central processing unit when said sub-central processing unit is detected as operating abnormally;
wherein said monitor information memory means includes a first operation information storage area and a second operation information storage area, said sub-central processing unit storing said operation information in said first operation information storage area each time said sub-central processing unit writes data to said data memory, said second operation information storage area including a flag having one of a first state and a second state, said flag being set by said host central processing unit and said sub-central processing unit in an alternating manner,
and wherein said host central processing unit only reads the data stored in said shared memory unit when said operation information indicates that said sub-central processing unit is in the normal state and the flag is set to the first state, and said host central processing unit cooperating with said reset means for resetting said sub-central processing unit when said operation information indicates that said sub-central processing unit is not in the normal state,
and wherein when said sub-central processing unit is in the normal state and writes data to said shared memory circuit, said sub-central processing unit sets said flag to the second state after writing the data to said data memory circuit.

2. A multiprocessor system according to claim 1, wherein said sub-central processing unit sets said operation information to one of a first and a second condition each time said sub-central processing unit writes data to said shard memory circuit, and in the normal state, said sub-central processing unit alternately sets said operation information to one of the first and second condition each time data is written to said shared memory circuit by said sub-central processing unit, and wherein said host central processing unit stores in said first random access memory a prior condition of said operation information obtained from a prior read from said shared memory circuit, and said host central processing unit compares said prior condition of said operation information with a current condition of said operation information stored in said shared memory circuit, said sub-central processing unit being determined to be in the normal state when said prior condition of said operation information and said current operation information are different, and said sub-central processing unit being determined to not be in the normal state when said prior condition of said operation information and said current operation information are equivalent.

3. A method for determining a status of a host-CPU and at least one sub-CPU connected to the host-CPU and to an I/O device, said host-CPU and said at least one sub-CPU each having their own dedicate memory and sharing a shared memory having a data portion and a first operation information field having one of a first and a second state and a second operation information field having one of a clear and a non-clear state, comprising the steps of:
   a) during a write mode by said sub-CPU to said shared memory when said sub-CPU is in a normal state,
      i) determining if said second operation information field is in said non-clear state by said sub-CPU;
      ii) if said second operation information field is in said non-clear state, alternately toggling said first operation information field to one of said first and second state for each write by said sub-CPU; and
      iii) setting said second operation information field to said clear state by said sub-CPU after said sub-CPU has written data to said shared memory; and
   b) during a read mode by said host-CPU from said shared memory when said host-CPU is in said normal state,
      i) performing a first read from said shared memory to obtain a state of said first operation information field at a time of said first read;
      ii) storing said state of said first operation information field obtained from said first read into said dedicated memory of said host-CPU;
      iii) determining if said second operation information field is in said clear state prior to a second read;
      iv) if said second operation information field is in said clear state, performing said second read from said shared memory to obtain a state of said first operation information field at a time of said second read;
      v) if said second operation information field is in said clear state, comparing said stat of said first operation information field stored in said dedicated memory of said host-CPU with said first operation information field currently stored in said shared memory;
      vi) reading data from said shared memory by said host-CPU and setting said second operation information field to said non-clear state if said comparing step indicates non-equivalence; and
      vii) resetting said sub-CPU by said host-CPU if said comparing step indicates equivalence.

* * * * *